No. 788,097. PATENTED APR. 25, 1905.
R. N. EHRHART.
FLUID PRESSURE TURBINE.
APPLICATION FILED AUG. 8, 1903.

WITNESSES:
C. L. Belcher
F. H. Miller

INVENTOR
Raymond N. Ehrhart
BY
Keeley S. Carr
ATTORNEY

No. 788,097. Patented April 25, 1905.

UNITED STATES PATENT OFFICE.

RAYMOND N. EHRHART, OF PITTSBURG, PENNSYLVANIA, ASSIGNOR TO THE WESTINGHOUSE MACHINE COMPANY, A CORPORATION OF PENNSYLVANIA.

FLUID-PRESSURE TURBINE.

SPECIFICATION forming part of Letters Patent No. 788,097, dated April 25, 1905.

Application filed August 8, 1903. Serial No. 168,732.

*To all whom it may concern:*

Be it known that I, RAYMOND N. EHRHART, a citizen of the United States, and a resident of Pittsburg, in the county of Allegheny and State of Pennsylvania, have invented a new and useful Improvement in Fluid-Pressure Turbines, of which the following is a specification.

My invention relates to fluid-pressure turbines, and has for its object to provide an engine of this character which shall be more compact in structure and which shall utilize the power applied more effectively than is usually the case in such mechanism.

It is a usual practice to provide a plurality of rotatable members mounted upon a single shaft, each having an annular series of blades or buckets, and to locate between adjacent members expansion-passages which are of progressively-increasing dimensions, so that as the pressure of the fluid decreases it may be progressively expanded, and thus impart the entire velocity which results from full expansion. It is also customary in some types of fluid-pressure turbines to provide a plurality of rotatable members, each mounted upon the same shaft and having an annular series of blades or buckets, and to locate between adjacent members passages the function of which is to guide the fluid discharged from one rotating member, composed of an annular series of blades or buckets, into the next rotatable member. Immediately preceding the first rotatable member an individual expansion-passage or nozzle is provided in which the elastic fluid is expanded to about the minimum pressure that is ultimately reached in the turbine and to the ultimate maximum velocity, which imparts energy to the succeeding rotatable members and is reduced by each succeeding rotatable member. I utilize this latter principle in my invention; but instead of providing a plurality of rotatable members I utilize the successive reductions of velocity of the propelling fluid in connection with a single rotatable member, so as to subject different parts of the same to the velocity resulting from the expansion of the propelling fluid in a preceding expansion-passage or nozzle or in a set of such passages or nozzles, as the case may be.

Figure 1:
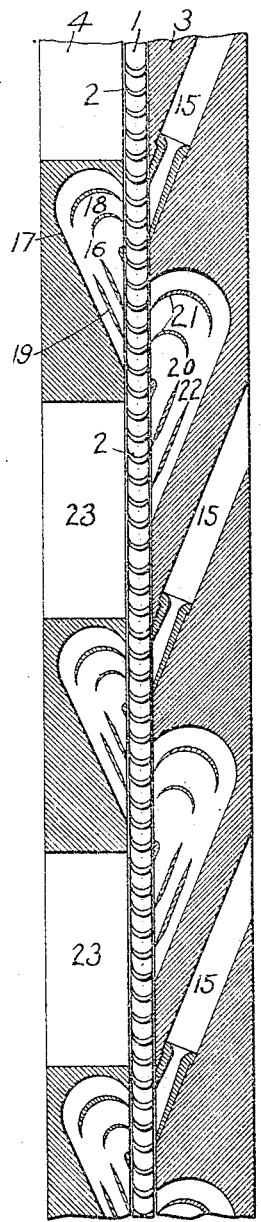
Figure 2:
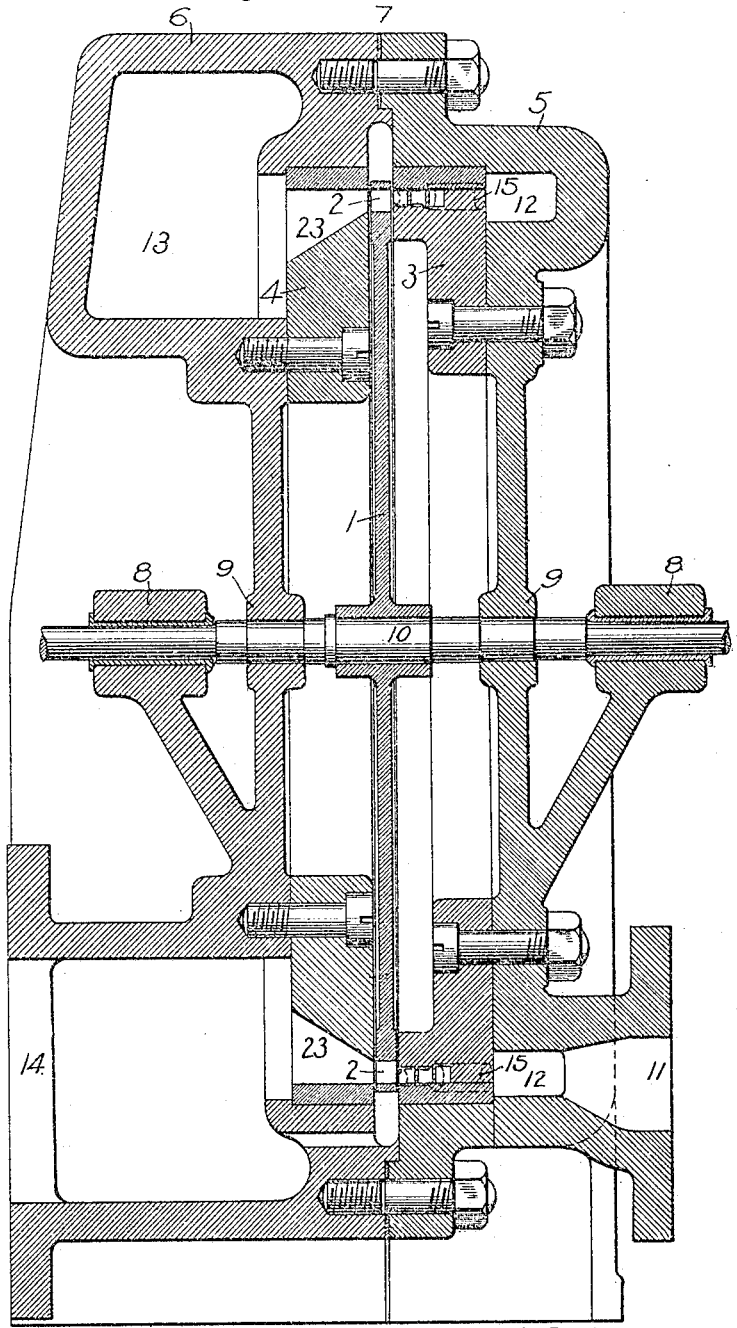

In the accompanying drawings, Figure 1 is a circumferential section developed into a plane of a portion of a turbine embodying my invention; and Fig. 2 is a longitudinal section of the turbine, a portion of which is shown in Fig. 1.

The rotary member 1 is in the form of a wheel or disk having an annular series of blades or buckets 2 disposed around its periphery and in close proximity to stationary rings 3 and 4, which are respectively bolted to the parts 5 and 6 of a frame or casing 7. The said casing parts are bolted together and are severally provided with bearings 8 and 9 for the shaft 10 of the wheel 1. The part 5 is provided with an inlet-port 11 and an annular supply-chamber 12, and the part 6 is provided with an annular exhaust-chamber 13 and an exhaust-port 14.

The ring 3 is provided with one or more inclined nozzles 15 of suitable form, the receiving ends of which connect with the supply-chamber and the discharge ends of which terminate in proximity to the blades 2 of the wheel 1. I have shown an annular series of nozzles; but of course any desired number, from one upward, may be utilized.

The expansion-passage or nozzle, or each of them, if there be more than one, is made of suitable form to expand the compressed fluid and to provide about the maximum velocity attainable by the expansion from its pressure when entering the nozzle or expansion-passage to its pressure at the exit from the turbine. The elastic fluid thus leaves the nozzle or expansion-passage and impinges on the blades or buckets 2 with about the maximum velocity and the minimum pressure attainable. After such impact the fluid exhausts with diminished velocity into a relatively large conducting-passage 16, here indicated as having an outer wall 17 of suitable curvature to satisfactorily guide the fluid and as also provided at its inlet with a plurality of curved partitions 18 and at its outlet with straight partitions 19, for directing the fluid against the adjacent blades or buckets, the fluid being exhausted after impact against such buckets with still more decrease in velocity into a conducting-passage 20 of substantially the same form as the passage 16, but of greater dimensions, to conform to the decreased velocity of the fluid, and located in the ring 3. This passage is also provided with curved partitions 21, and at its outlet end with partitions 22, between which the fluid exhausts against the blades or buckets 2 and then through a passage 23 into the chamber 13. The number of these conducting-passages, which are located alternately and progressively at the opposite sides of the member 1, may be such as to utilize effectively the entire velocity which may result from complete expansion of the fluid. This complete expansion may be partially carried out in the series of conducting-passages and partially in the rotatable member without interfering with the scope of this invention, the passages here shown being intended merely to illustrate a suitable and operative arrangement without imposing any limitation as to number or form of said parts.

I claim as my invention—

In a turbine the combination of a working member having buckets, means for directing a fluid against said buckets at one point in the circumference of said working member, a guide-passage having a bend leading from the point of exhaust of said first point of application to a second point of application on said working member, and a supplemental guide or deflector arranged in the bend of said second passage for receiving the impact of the fluid at said bend and being coterminous with said bend and shorter than said passage.

In testimony whereof I have hereunto subscribed my name this 1st day of August, 1903.

RAYMOND N. EHRHART.

Witnesses:
 VINCENT M. FROST,
 BIRNEY HINES.